B. G. LAMME.
SYSTEM OF OPERATION FOR DYNAMO ELECTRIC MACHINES.
APPLICATION FILED MAR. 15, 1906.

977,640.

Patented Dec. 6, 1910.

3 SHEETS—SHEET 1.

WITNESSES:
Camille Boulin
Otto S. Schauer

INVENTOR
Benjamin G. Lamme
BY
Wesley G. Carr
ATTORNEY

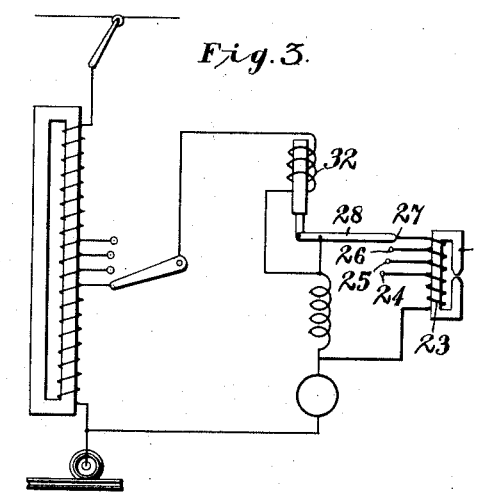
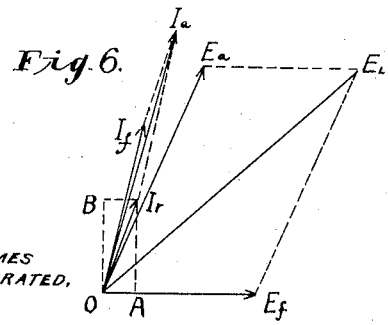
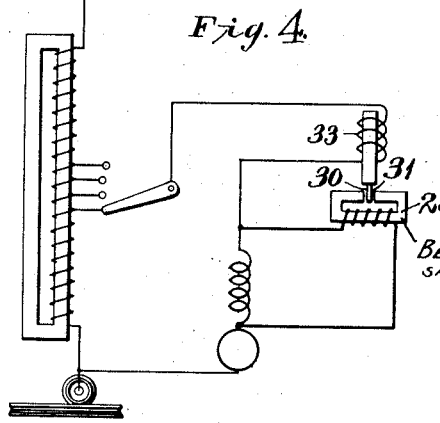
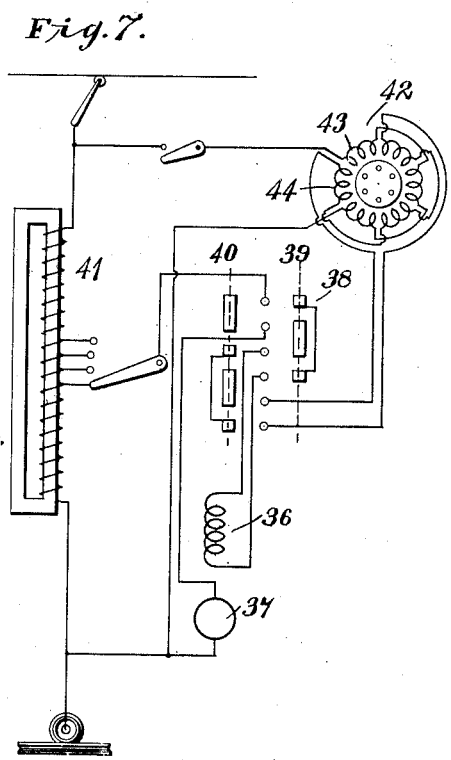
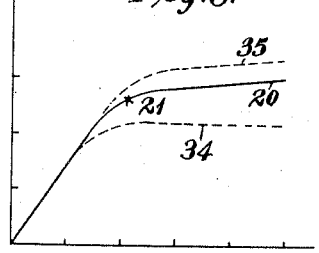

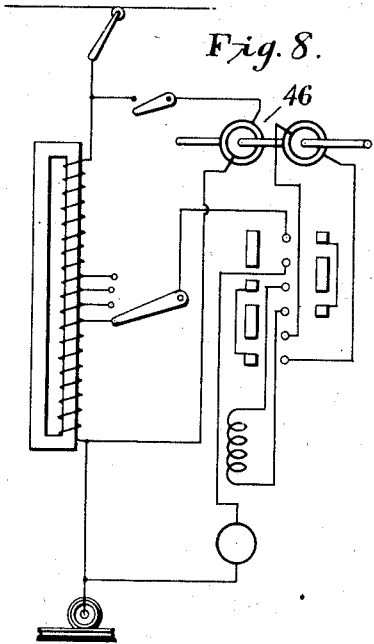
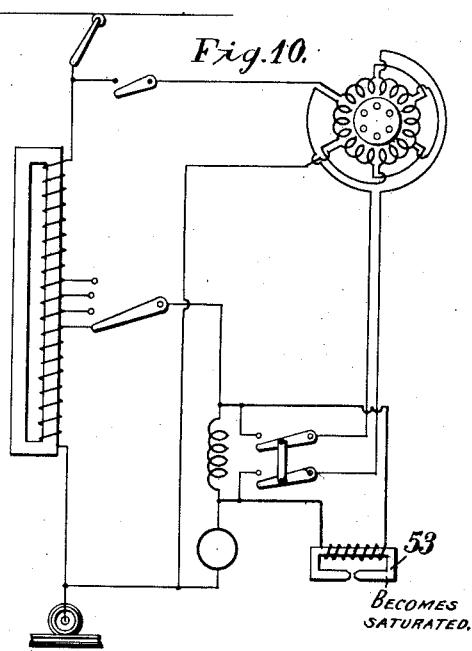
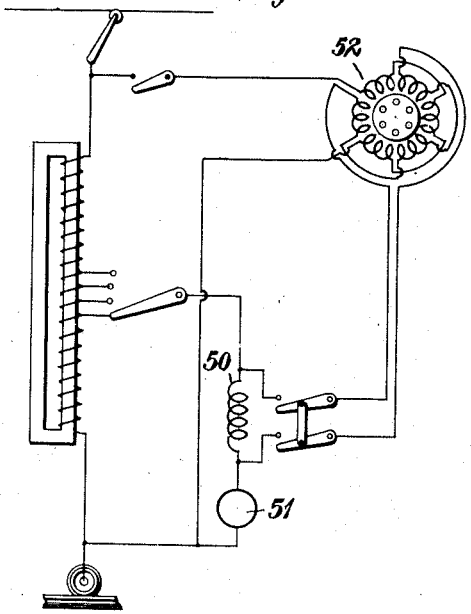

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF OPERATION FOR DYNAMO-ELECTRIC MACHINES.

977,640.

Specification of Letters Patent.   Patented Dec. 6, 1910.

Application filed March 15, 1906. Serial No. 306,217.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Systems of Operation for Dynamo-Electric Machines, of which the following is a specification.

My invention relates to dynamo-electric machines, and particularly to alternating current motors of the commutator type of construction.

One object of my invention is to provide means whereby alternating current motors of the character indicated may be prevented from becoming automatically converted into generators of direct current and whereby they may be caused to operate as generators of alternating current under stable conditions, or under conditions that may be governed. By the same means as is employed for causing stable conditions of operation of a motor as a generator of alternating current, the speed characteristic of the motor; *i. e.*, the speed of the motor with variations in load, may be adjusted to meet desired or given conditions of operation.

Figure 1:
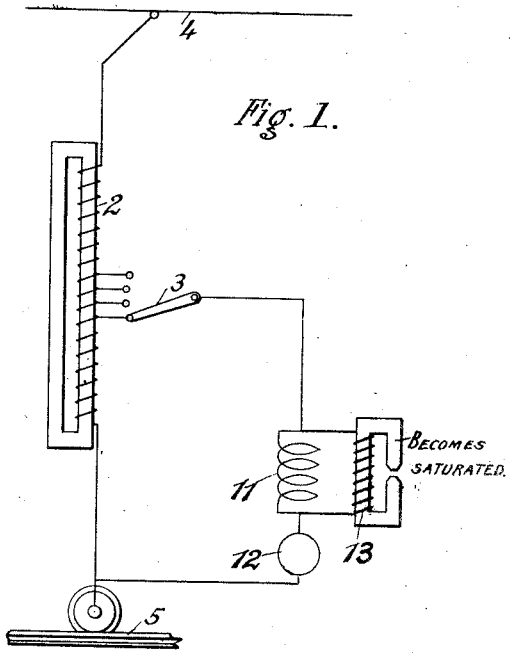
Figure 2:
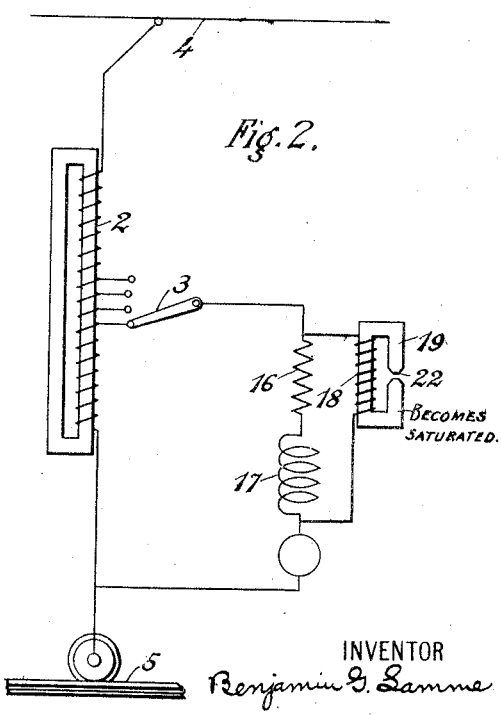

Figure 1 of the accompanying drawings is a diagrammatic view of a system that embodies my invention. Figs. 2 to 4, inclusive, are diagrammatic views of other systems that embody my invention. Figs. 5 and 6 are diagrams that are useful in explaining the operation of the invention, and Figs. 7 to 10, inclusive, are diagrammatic views of modifications of my invention.

When electric motors of the commutator type are employed for propelling railway and other vehicles, their field magnet and armature windings are usually connected in series relation, and if alternating current energy is applied to such a motor at a variable voltage by varying the active length of a transformer winding, the motor is evidently included in a closed circuit of comparatively low resistance to direct current. It has been found, under such circumstances, that the motor may automatically become a generator of direct current if the connections of the field magnet and armature windings are reversed with reference to each other while the vehicle is in motion. This action may occur even though alternating current is supplied to the transformer. In order to prevent the motor from operating thus as a generator of direct current, I propose to prevent, or to substantially prevent, direct current from traversing the one or the other of the motor windings.

In Fig. 1, the alternating current voltage applied to a motor may be varied by varying the active length of a transformer winding 2 by any suitable means, such as a switch arm 3, that is adapted to connect one terminal of the motor to convenient points of subdivision of the transformer winding. The motor may be employed to propel a vehicle to which energy may be supplied from a trolley conductor 4 and a track rail 5.

Field magnet and armature windings 11 and 12 of the motor are connected in series relation and the field magnet winding is shunted by means of a device 13 having high inductive resistance and low ohmic resistance, as compared with the field magnet winding. When the motor is supplied with alternating current, substantially all of the current will be caused to traverse the field magnet winding because of the high inductive resistance of the device 13, while if, for any reason, direct current should be caused to traverse the circuit, substantially all of it will traverse the device 13 instead of the field magnet winding 11 because of its lower ohmic resistance. Thus the motor is prevented from operating as a direct current generator because the field magnet winding is prevented from becoming sufficiently energized. Since the ohmic resistances of the field magnet windings of such motors are usually very low, it may be necessary to provide an impedance device of very large mechanical dimensions in order that its ohmic resistance may be less than that of the field magnet winding.

In order to permit of the employment of a smaller device, a resistance 16 (Fig. 2) may be connected in series with the field magnet winding 17 and an impedance device 18 may be connected in shunt circuit to both the resistance 16 and the field magnet winding 17.

While it is very desirable that the motor be prevented from acting as a generator of direct current, it may be of great advantage, at times, to cause it to operate as a generator of alternating current in order that power may be supplied to the distributing circuit as, for instance, when a vehicle upon which the motor is mounted descends a grade or moves by inertia. When the field magnet and armature windings are connected in series relation, it has been found that under certain conditions, the current supplied by the motor operating as a generator will increase. This increase of current causes an increase of the field strength which, in turn, causes the voltage of the generator to increase, and abnormal amounts of power may be supplied to the distributing circuit. The motor may thus be caused to operate as a very powerful dynamic brake rather than as a generator, the operation of which may be controlled.

In order that the motor may be caused to operate as a generator under stable conditions, or under conditions that may be governed, it is obviously necessary that the field strength be maintained substantially constant or be under control. Such conditions may be secured if core 19 of the impedance device 13 of Fig. 1 just becomes magnetically saturated: i. e., if the bend or knee of its curve of magnetization 20 (Fig. 5) occurs, when the field of the motor is of normal or of a predetermined strength. The field strength cannot then be increased in a substantial degree because, if the current in the armature increases, that in the field magnet winding will also increase somewhat, which accordingly causes an increase in the difference of potential between the terminals of the field magnet winding and likewise between the terminals of the impedance device. The increase in the voltage applied to the impedance device will cause a greatly increased amount of current to traverse it so that only a very small part of an increase in the current that traverses the armature will traverse the field magnet winding, and the motor field strength will remain almost constant or will vary only slightly with variations in the amount of current that traverses the armature. Thus, the substantial equivalent of a magnetically saturated field is secured, though the energy losses in the field do not correspond to a saturated condition.

In Fig. 5, the abscissae of the curve 20 are proportional to the amounts of current traversing the impedance device and the ordinates are proportional to the degree of magnetization. As just explained, the field magnet winding will be normally energized when the magnetization of the core of the inductive winding corresponds to that represented at 21 near the bend or knee of the curve.

In order to indicate in the drawings that the cores of the impedance devices are magnetically saturated, they have been constricted adjacent to gaps 22 therein, though the same result may, of course, be secured by other means.

It will be readily understood that the motor, when operating as a generator, will be connected to such a point in the transformer winding as corresponds to the voltage generated, by means of the switch arm 3, and that, in this manner, current may be supplied to the distributing circuit through the transformer.

It may be desired, in some instances, to be able to increase the strength of the field of the motor above the predetermined limit, or to vary it with variations in the amount of armature current, and, accordingly, in Figs. 3 and 4, I have shown means whereby the degrees of magnetization of the cores of the inductive windings may be varied in order that the cores may become magnetically saturated at different field strengths, or at different amounts of armature current.

In Fig. 3, the winding of the impedance device 23 is subdivided by means of leads 24, 25, 26 and 27 and the number of turns of the winding that are included in the shunt circuit may be varied in the usual manner by means of a switch arm 28, and in Fig. 4 the effective cross-sectional area of magnetizable core 29 may be varied by varying the position of section 30 thereof that is movable in a gap 31. The field strengths may be caused to vary in accordance with variations in the amount of armature current if the switch arm 28 and the core section 30 are adapted to be operated by electro-magnets, windings 32 and 33, respectively, of which are connected in series with the armatures. It will, of course, be understood that the degrees of magnetization of the cores of the inductive windings may be varied in any other suitable manner. From a consideration of curves 20, 34 and 35 of Fig. 5, it will be readily seen that the relative positions of the bends or knees of the magnetization curves depend upon the amounts of current necessary to produce magnetic saturation of the core.

The employment of an impedance device in shunt to the field magnet winding of a motor, the core of which device becomes magnetically saturated when a predetermined amount of current traverses the field magnet winding, is useful not only, as just described, when operating the motor as a generator, but it also permits of altering the speed characteristic of the motor, when operating as such, to obtain desirable conditions of operation not otherwise obtainable. This will be readily understood from the following discussion.

In single-phase alternating current motors of the commutator type of construction having series-connected field magnet and armature windings, the flux density in the field is usually low, and the ratio of the ampere turns of the field magnet winding to those of the armature winding is also low, particularly as compared with the corresponding values and relations in direct current motors. As a large portion of the ampere turns of the field magnet winding is required to overcome the reluctance of the air-gap between the field magnet and armature, the armature is consequently located in a rather weak field, unless the air-gap is impracticably short. As a result, the speed of such a motor usually decreases rapidly with increase in load or torque, which characteristic is very desirable under some conditions. If, however, the motor is so designed that a vehicle propelled thereby will run at a moderately high speed when heavily loaded, it may be operated at an excessively high speed when the vehicle is only lightly loaded. Under such service conditions it is evidently desirable that the curve of the speed characteristic be rather flat; that is, the speed should not vary beyond reasonable limits, with variations in load. In order to obtain slower speeds at light loads with such a motor, the field should be stronger than is usually the case, to which condition there is no objection if only light load running is considered. The power factor of such a motor at light loads is usually very high, and consequently the ampere turns in the field magnet winding may be materially increased without unduly increasing the self-induction of the motor. However, with a strong field at heavy loads the reactance of the field magnet winding may be excessive and the motor will have a low power factor while the conditions of starting may also be poor.

A motor may be given a speed characteristic such that it may operate at high speeds when heavily loaded and not above a reasonable or predetermined speed when lightly loaded if, when heavily loaded, some portion of the magnetic circuit thereof is highly saturated, and when lightly loaded, it is unsaturated or only slightly saturated. When thus constructed, the flux density in the magnetic circuit of the motor is not permitted to increase in proportion to the increase of load, and consequently the self-induction of the field magnet winding will not increase at the same rate. With a lower self-induction in the field circuit at heavy loads, the counter electromotive force of the motor could be proportionately higher, resulting in a higher speed and a greater power output. With such an arrangement, however, high iron losses will occur in the highly saturated portion of the magnetic circuit, because of the alternating character of the flux. Another disadvantage arises from the fact that the permeability curves of different lots of steel when highly saturated may be very unlike, so that motors of the same size may differ considerably in speed when heavily loaded.

The desired speed characteristic of the motor of Fig. 1 may be obtained if the core of the impedance device 13 is not quite magnetically saturated, or has just become saturated, when the motor is lightly loaded and but a comparatively small amount of current is taken thereby, but which becomes saturated as the load upon the motor increases and the current taken thereby also increases. Thus, at light loads, the impedance device shunts only a small amount of current around the field magnet winding, but as the load increases, the drop of potential over the field magnet winding also increases, and the impedance device shunts a greatly increased amount of current around the field magnet winding, providing, of course, the core of the impedance device becomes magnetically saturated at a rapid rate, and more rapidly than the magnetic circuit of the motor. Thus the current which traverses the impedance device increases in amount at a greater rate than that which traverses the field magnet winding, and the currents in the armature and field magnet windings vary disproportionately with variations in the load upon the motor, the effect upon the operation of the motor being equivalent to a reduction in the number of turns in the field magnet winding as the load increases. The motor is accordingly caused to operate as if its magnetic circuit were unsaturated when it is lightly loaded and highly saturated when heavily loaded; that is, its speed characteristic is made to correspond to that of a motor having a highly saturated magnetic field when heavily loaded. By varying the proportions of the impedance device, as, for instance, by altering the number of turns of its winding, or the dimensions and character of its magnetic circuit, the shape of the speed curve of the motor may be adjusted, and the same motor may thus be readily adapted for different service conditions.

The use of the impedance device in shunt to the field magnet winding of the motor as just described permits of designing the motor for low saturations or flux densities and small electrical losses. Of course, some electrical losses occur in the impedance device, but they will not be as great as those which result from saturation of some portion of the magnetic circuit of the motor when it is heavily loaded. The heat caused by the electrical losses in the impedance device may also be more readily dissipated than the heat generated in the motor, because the impedance device may be more simple in construction and more readily adapted to be cooled by proper ventilation or immersing in oil. Another advantage to be derived from the use of a choke coil over a motor having some portion of its magnetic circuit saturated, lies in the fact that the choke coil shunts a considerable portion of the current from the field magnet winding when the motor is heavily loaded, and consequently smaller conductors may be employed in the field magnet winding, and the total weight of copper for a given number of turns may be less. Thus, a comparatively large number of turns may be placed in the field magnet winding in order to obtain the desired field strength at light loads, and at heavy loads, the choke coil may shunt sufficient current from the winding to prevent overheating thereof.

It will, of course, be understood that if a vehicle is propelled by two or more motors that are permanently connected in series, the field magnet windings of the motors may be connected together and shunted by a single choke coil and, obviously, other arrangements of the circuits may also be made when more than one motor is employed, without altering the mode of operation of the invention or departing from its spirit.

It has been pointed out that, in order to prevent the motor from operating as a generator of direct current, the ohmic resistance of the device that is connected in shunt to the field magnet winding should be low, as compared with that of the field magnet winding, and from a consideration of the vector diagram of Fig. 6, it will be understood that it is also desirable that the ohmic resistance of the impedance device be low, as compared with its inductive resistance, in order that the field magnetism may be substantially in phase with the current in the armature.

$OE_f$ represents the electromotive force of the field magnet winding and $OI_f$ the current in the field magnet winding, the current lagging nearly 90° behind the electromotive force because the field is largely inductive.

OA represents the component of the current in the impedance device that is in phase with the impressed electromotive force $OE_f$, and OB represents the component of the current in the impedance device that lags approximately 90° behind the impressed electromotive force.

$OI_r$ represents the resultant current that traverses the impedance device. The current $OI_a$ in the armature is the resultant of the currents in the field magnet winding and in the impedance device, $OI_f$ and $OI_r$ respectively. Obviously, the inductive component OB must be large as compared with the non-inductive component OA of the current in the impedance device, since the more nearly the currents $OI_f$ and $OI_r$ agree in phase, the more nearly will the currents in the armature and field magnet windings agree in phase.

As in direct current practice, a motor of the commutator type may be caused to operate under stable conditions as a generator of alternating current, if the field magnet winding is separately or constantly excited. If, however, the field magnet winding should be supplied from the same circuit as that to which the armature is connected, the electromotive force of the armature would be considerably out of phase (nearly 90°) with the electromotive force of the circuit, since the field magnet winding is highly inductive and the current therein lags nearly 90° behind the electromotive force. Accordingly, when the motor is operated as a generator, I propose to supply the field magnet winding from a phase changing device that is interposed between the field magnet winding and the circuit to which the armature is connected, the phase changing device being so constructed and arranged as to supply an electromotive force to the field magnet winding of such a phase that the electromotive force of the armature will agree approximately in phase with the electromotive force of the circuit to which the armature is connected.

In Fig. 7, field magnet winding 36 and armature 37 are connected in series relation for operating the machine as a motor when the controller 38 occupies the position indicated by broken line 39, and when the machine is operated as a generator, the controller 38 is adapted to occupy the position indicated by broken line 40, the armature 37 being thereby connected directly to transformer 41 while field magnet winding 36 is supplied from a phase-changing device 42. The latter device may comprise a continuously running induction motor, one winding 43 of which is supplied directly from the transformer 41 and is so disposed with reference to another winding 44 that the electromotive force applied to the field magnet winding may be of a phase such that electromotive force of the armature will agree in phase with that of the transformer 41. Other suitable forms of phase changing devices may be employed, such, for instance, as a synchronously operated motor generator 46, (Fig. 8), the generator electromotive force of which is so disposed with reference to the electromotive force applied to the motor that the electromotive force of the motor armature may agree approximately in phase with the electromotive force of the transformer.

It will be readily seen that when the system is arranged as shown in Figs. 7 and 8 the phase changing device must have sufficient capacity to supply the field magnet winding with all of the current required for its excitation. In order that a comparatively small phase-changing device may be employed, field magnet and armature windings 50 and 51 of the motor (Fig. 9) may be connected permanently in series relation, and the phase-changing device 52 may be connected in shunt to the field magnet winding only, when the motor is operated as a generator. A substantially constant electromotive force is thus applied to the field magnet winding and conditions may be so adjusted that normally all of the armature current traverses the field magnet winding, and the shunt circuit remains substantially inactive. However, if the armature current falls below the normal value, the deficit of current will be supplied to the field magnet winding by the phase changing device, while if the current traversing the motor armature exceeds the normal value the excess will be supplied to the phase-changing device, thus preventing it from traversing the field magnet winding.

It may be found, when the field magnet winding is separately excited from a phase-changing device, that the motor will become automatically converted into a generator of direct current under the proper conditions, and in order to prevent such action an impedance device 53 may also be connected in shunt to the field magnet winding, as shown in Fig. 10, for the purpose of substantially preventing direct current from traversing the field magnet winding.

It will be understood in each case when changing from a motor to a generator that the connections of the motor windings with reference to each other should be changed, but in most of the figures of the drawings such changes have not been indicated because of the complication and confusion of the circuits that might result.

The specific applications of the invention herein shown and described are only illustrative of the manner in which the invention may be employed, and I desire to cover broadly all such applications and arrangements of the circuits as do not materially change the mode of operation thereof.

I claim as my invention:

1. The combination with a dynamo-electric machine having series-connected armature and field magnet windings, of means for preventing the machine from becoming a generator of direct current.

2. The combination with a dynamo-electric machine having field magnet and armature windings, of means for preventing the machine from becoming a generator of direct current and for maintaining the current that traverses the field magnet winding substantially constant in amount when the machine is operated as a generator of alternating current.

3. The combination with a dynamo-electric machine having field magnet and armature windings, of means for preventing the machine from becoming a generator of direct current and for maintaining the current that traverses the field magnet winding substantially constant in amount and substantially in phase with the current traversing the armature winding when the machine is operated as a generator of alternating current.

4. The combination with a dynamo-electric machine having series-connected field magnet and armature windings, of means for preventing the machine from becoming a generator of direct current and whereby the amount of current that traverses the field magnet winding may be maintained substantially constant when the machine is operated as a generator of alternating current.

5. The combination with a dynamo-electric machine having series-connected field magnet and armature windings, of means for preventing the machine from becoming a generator of direct current, and whereby the amount of current that traverses the field magnet winding may be maintained substantially constant when the machine is operated as a generator of alternating current, and also whereby the field magnetism may be caused to agree approximately in phase with the armature current.

6. The combination with a dynamo-electric machine that may be operated either as a motor or as a generator and is provided with series-connected field magnet and armature windings, of means whereby the current that traverses the field magnet winding may be maintained substantially constant in amount and substantially in phase with that traversing the armature winding when the machine is operated as a generator.

7. The combination with a dynamo-electric machine that may be operated either as a motor or as a generator and is provided with field magnet and armature windings that are series-connected for both motor and generator operation, of means whereby the current traversing the field magnet winding may be caused to differ in amount from, and may be maintained substantially in phase with, that traversing the armature winding when the machine is operated as a generator.

8. The combination with a dynamo-electric machine having field magnet and armature windings, of an impedance device that is arranged in shunt circuit to the field magnet winding and the field of which is magnetically saturated when a predetermined amount of current traverses the field magnet winding.

9. The combination with a dynamo-electric machine having field magnet and armature windings, of a reactance device that is arranged in shunt circuit to one of the aforesaid windings, and means whereby the reactance thereof may be varied in accordance with the amount of current that traverses the circuit.

10. The combination with a dynamo-electric machine having series-connected field magnet and armature windings, of a reactance device that is arranged in shunt circuit to the field magnet winding, and means whereby the reactance thereof may be varied.

11. The combination with a dynamo-electric machine having field magnet and armature windings, of a reactance device that is arranged in shunt circuit to the field magnet winding, and means whereby the reactance thereof may be varied in accordance with the amount of current that traverses the armature circuit.

12. The combination with a dynamo-electric machine having field magnet and armature windings, of an impedance device that is arranged in shunt circuit to one of the aforesaid windings and the field of which is magnetically saturated when a predetermined amount of current traverses the circuit.

13. The combination with a dynamo-electric machine having field magnet and armature windings, of an impedance device that is arranged in shunt circuit to one of the aforesaid windings and the field of which is magnetically saturated when a predetermined amount of current traverses the circuit, and means whereby the current value at which the field of the impedance device becomes saturated may be varied.

14. The combination with a dynamo-electric machine having field magnet and armature windings, of an impedance device that is arranged in shunt circuit to one of the aforesaid windings and the field of which is magnetically saturated when a predetermined amount of current traverses the circuit, and means whereby the current value at which the field of the impedance device becomes saturated may be varied in accordance with the amount of current that traverses the circuit.

15. The combination with a dynamo-electric machine having field magnet and armature windings, of an impedance device that is arranged in shunt circuit to the field magnet winding and the field of which is saturated when a predetermined amount of current traverses the field magnet winding, and means whereby the current value at which the field of the impedance device becomes saturated may be varied.

16. The combination with a dynamo-electric machine having field magnet and armature windings, of an impedance device that is arranged in shunt circuit to the field magnet winding and the field of which is magnetically saturated when a predetermined amount of current traverses the field magnet winding, and means whereby the current value at which the field of the impedance device becomes saturated may be varied in accordance with the amount of current that traverses the armature circuit.

17. The combination with a dynamo-electric machine having field magnet and armature windings, of another winding having low ohmic resistance and high inductive resistance that is arranged in shunt circuit to one of the windings, and means whereby the inductance of the latter winding may be varied in accordance with the amount of current that traverses the machine.

18. The combination with a dynamo-electric machine having field magnet and armature windings, of a winding having low ohmic resistance and high inductive resistance that is arranged in shunt circuit to the field magnet winding, and means whereby the inductive resistance of the latter winding may be varied.

19. The combination with a dynamo-electric machine having field magnet and armature windings, of a winding having low ohmic resistance and high inductive resistance that is arranged in shunt circuit to the field magnet winding, and means whereby the inductive resistance of the latter winding may be varied in accordance with the amount of current that traverses the armature winding.

20. The combination with an electric motor having series-connected field magnet and armature windings, of a shunt for the field magnet winding in which the current increases in amount at a greater rate than in the field magnet winding as the load upon the motor increases.

21. The combination with an electric motor having series-connected field magnet and armature windings, of an impedance device connected in shunt relation to the field magnet winding, the current traversing which increases in amount at a greater rate than that which traverses the field magnet winding as the load upon the motor increases.

22. The combination with an electric motor having field magnet and armature windings, of an impedance device connected in shunt relation to the field magnet winding, the current traversing which varies in amount disproportionately to that which traverses the field magnet winding as the load upon the motor varies.

23. The combination with an electric motor having series-connected field magnet and armature windings, of an impedance device connected in shunt relation to the field magnet winding, the impedance of which varies disproportionately to variations in load upon the motor.

24. The combination with an electric motor having series-connected field magnet and armature windings, of an impedance device connected in shunt relation to the field magnet winding, the impedance of which increases at a slower rate than that of the motor, as the load upon the motor increases.

25. The combination with an electric motor having series-connected field magnet and armature windings, of an impedance device connected in shunt relation to the field magnet winding and having a core that becomes magnetically saturated as the load upon the motor increases.

26. The combination with an electric motor having series-connected field magnet and armature windings, of an impedance device connected in shunt relation to the field magnet winding and having a core that becomes magnetically saturated prior to saturation of the magnetic circuit of the motor as the load upon the motor increases.

27. The combination with an electric motor having series-connected field magnet and armature windings, of an impedance device connected in shunt relation to the field magnet winding and having a core that becomes magnetically saturated at a greater rate than the magnetic circuit of the motor.

28. The combination with an electric motor having field magnet and armature windings, of an impedance device connected in shunt relation to the field magnet winding, the current traversing which varies in amount disproportionately to that which traverses the armature winding as the load upon the motor varies.

In testimony whereof, I have hereunto subscribed my name this 13th day of March, 1906.

BENJ. G. LAMME.

Witnesses:
OTTO S. SCHAIRER,
BIRNEY HINES.